United States Patent [19]
Weaver et al.

[11] Patent Number: 5,973,038
[45] Date of Patent: Oct. 26, 1999

[54] THERMOPLASTIC POLYMER COMPOSITIONS CONTAINING BLACK DYE COMPOSITIONS

[75] Inventors: Max Allen Weaver, Kingsport; Clarence Alvin Coates, Jr., Blountville; Jean Carroll Fleischer, Kingsport; Brian Edison Maxwell, Johnson City, all of Tenn.

[73] Assignee: Eastman Chemical Company, Kingsport, Tenn.

[21] Appl. No.: 09/078,227

[22] Filed: May 13, 1998

[51] Int. Cl.$^6$ .................................. C08K 5/34; C09F 9/00
[52] U.S. Cl. ........................ 524/90; 106/287.25; 106/498
[58] Field of Search .......................... 524/90; 106/287.25, 106/498; 544/337

[56] References Cited

U.S. PATENT DOCUMENTS

| | | | |
|---|---|---|---|
| 3,833,536 | 9/1974 | Steinbeck et al. | 524/90 |
| 4,692,189 | 9/1987 | Babler et al. | 106/308 |

OTHER PUBLICATIONS

R. Gächter and H. Müeller, Editors: Plastics Additives Handbook, Hansu Publishers, New York, 1985, pp. 507–533; 729–741.

"The Chemistry of Synthetic Dyes and Pigments", Lubs, Reinhold Publishing Corp., 1955, pp.513–514.

Primary Examiner—Kriellion Sanders
Attorney, Agent, or Firm—Jonathan D. Wood; Harry J. Gwinnell

[57] ABSTRACT

The present invention relates to a black polymeric composition suitable for use in films, fibers and molded articles, where a soluble, easily dispersed colorant is desirable. The black polymeric composition provides a high black color quality and is small enough to function as a black colorant in microdenier fibers. The black polymeric composition comprises a thermoplastic resin in an amount between about 50 weight percent and about 99.9 weight percent of the black polymeric composition, and a black dye composition in an amount between about 0.1 weight percent and about 50 weight percent of the black polymeric composition. The black dye composition contains a black indanthrone compound as a major component. As used herein, black indanthrone compounds are defined as compounds having the general structure represented by Formula I:

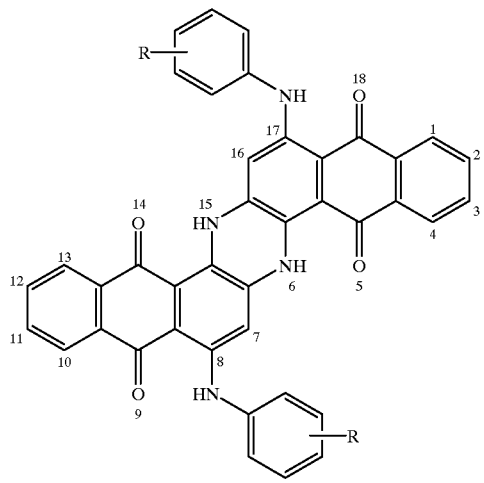

Formula I wherein R is hydrogen or at least one group independently selected from $C_1$–$C_8$ alkyl, $C_1$–$C_8$ alkoxy, halogen, hydroxy, trifluoromethyl, aryloxy, arylthio, arylamino, $C_1$–$C_8$ carbalkoxy, —$CO_2H$, $C_1$–$C_8$ alkanoyloxy, arylazo, —CN, —$NO_2$, —$SO_2$—$C_1$–$C_8$ alkyl, —$SO_2N(R1)R2$, and —CON(R1)R2, wherein R1 and R2 are independently selected from $C_1$–$C_8$ alkyl, $C_3$–$C_8$ cycloalkyl, aryl and hydrogen. The present invention further relates to a process for preparing the black polymeric composition, processes for preparing the black dye composition and articles formed from the black polymeric composition.

30 Claims, No Drawings

THERMOPLASTIC POLYMER COMPOSITIONS CONTAINING BLACK DYE COMPOSITIONS

INTRODUCTION

The present invention is directed to polymeric compositions for use as colorants in applications such as molded articles, films and fibers. More particularly, the present invention is directed to black polymeric compositions which are suitable for producing black shades when melt blended and extruded into thermoplastic materials.

BACKGROUND OF INVENTION

In many applications where molding or spinning of pre-colored thermoplastic materials is used to prepare a colored article, it is desirable to have an evenly dispersed soluble dye in the resin as opposed to a pigment. Dyes commonly provide higher color strength, higher transparency and lower abrasion (in spinning of fibers) than pigments. A problem is, however, that no "true" black organic dye colorant exists.

Attempts have been made to produce adequate dark grays and black colors using organic dyes, usually by combining dyes of different colors, such as orange dyes and blue dyes. Unfortunately, these combinations require tedious process steps and produce products having inadequate color quantity. For instance, when a blue dye is mixed with an orange dye to form a black dye, the orange dye and the blue dye must fade at the same rate or the black will lose its color and exhibit an orange or blue tint. These and other problems have practically prevented the use of dyes as black colorants in thermoplastic materials.

Because no true black dye exists and attempts at combining dyes of differing colors have been unsuccessful, black pigments, such as carbon black, have traditionally been used to generate black coloration in thermoplastic materials. While carbon black produces materials having high black color strength, the use of carbon black in the processing of black thermoplastic materials results in problems with clogging of filter packs and erosion of spinnerets.

In addition, when carbon black is used to color fine denier thermoplastic fibers, such as fibers of less than about 4.0 denier/filament, weak fibers that are susceptible to breaking and fragmenting are formed. These weak fine denier fibers are a result of the size of the black pigment particles in relation to the fibers. For instance, as the fiber size decreases, the black pigment particles consume more and more of the diameter of the fiber, decreasing the amount of fiber-fiber bond at the location of the black particles. Hence, fine denier fibers containing pigment colorants generally result in fibers, which lack the strength for practical usage. Despite these drawbacks, carbon black has been the black colorant of choice in thermoplastic materials.

It is apparent from the above that there is a need for a black colorant that provides and maintains high black color quality in thermoplastic materials, such as molded articles, films and fibers. Furthermore, there is a need for a black dye composition that is small enough to function as a black colorant for fine denier fibers, such as fibers of less that 4 denier/filament.

SUMMARY OF THE INVENTION

The present invention relates to a black polymeric composition suitable for use in films, fibers and molded articles, where a soluble, easily dispersed colorant is desirable. The black polymeric composition provides a high black color quality and is small enough to function as a black colorant in microdenier fibers.

The black polymeric composition comprises a mixture, such as a blend, of a thermoplastic resin and black dye composition. The thermoplastic resin is preferably present in the black polymeric composition in an amount between about 50 weight percent and about 99.9 weight percent, and the black dye composition is preferably present in an amount between about 0.1 weight percent and about 50 weight percent.

The black dye composition contains an indanthrone compound as a major component. As used herein, black indanthrone compounds are defined as a compounds having the general structure represented by Formula I:

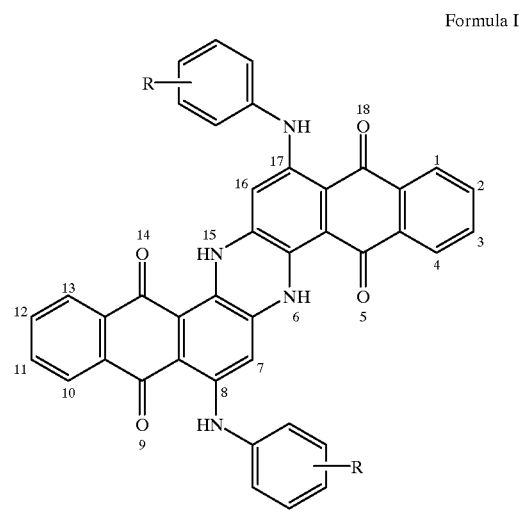

Formula I wherein R is hydrogen or at least one group independently selected from $C_1$–$C_8$ alkyl, $C_1$–$C_8$ alkoxy, halogen, hydroxy, trifluoromethyl, aryloxy, arylthio, arylamino, $C_1$–$C_8$ carbalkoxy, —$CO_2H$, $C_1$–$C_8$ alkanoyloxy, arylazo, —CN, —$NO_2$, —$SO_2$—$C_1$–$C_8$ alkyl, —$SO_2N(R1)R2$, and —CON(R1)R2, wherein R1 and R2 are independently selected from $C_1$–$C_8$ alkyl, $C_3$–$C_8$ cycloalkyl, aryl and hydrogen.

The black polymeric composition is preferably prepared by combining a black dye composition with a thermoplastic resin to form a mixture using any suitable process known in the art, and then melt blending the mixture to form the polymeric composition. Melt blending the composition can be accomplished by any suitable process known in the art including admixing the black dye composition with the thermoplastic resin. The melt blending process is preferably performed in an extruder.

Alternatively, the black polymeric composition comprises the reaction products of at least one diacid component or its ester forming derivative, at least one diol component, and the black dye composition represented by Formula I, wherein R is a reactive group capable of being copolymerized polymeric compositions. As used herein, the term "reactive group" includes hydroxy, carboxy, $C_1$ to $C_8$ carbalkoxy and $C_1$ to $C_8$ alkanoyloxy. The reaction used to prepare the black polymeric composition is preferably a copolymerization process.

The copolymerization process preferably comprises combining at least one diacid component or its ester derivative, at least one diol component and the black dye composition to form a mixture; and polymerizing the mixture to form a black polymeric composition containing the black dye composition in an amount between about 0.1 to about 30 weight percent.

As used herein, the term "black polymeric composition" is used to define polymeric compositions comprising a black dye composition, whether it be in the form of a mixture, blend or the product of a reaction. The present invention is further directed to thermoplastic articles containing black polymeric compositions and processes for preparing thermoplastic articles containing black polymeric compositions. Thermoplastic articles within the scope of the present invention include moldable articles, films and fibers. Molded articles as defined herein are articles formed by standard molding processes, including: injection molding, thermoforming, extrusion blow molding, injection blow molding, and reheat blow molding.

The present invention is especially useful for the manufacture of fine denier fibers and methods for preparing fine denier fibers containing black polymeric compositions. As defined in the present invention, fine denier fibers are fibers having a denier no greater than about 4. For example, black melt spun fiber can be prepared using the black polymeric compositions. Because the black polymeric compositions are used as opposed to carbon black, the black melt spun fiber formed can be spun in a variety of weights including fine denier fiber (<4.0 denier/filament) and even very fine "microdenier" fiber (<1.0 denier/filament) with no loss in fiber quality.

Additionally, the present invention is directed to a process for preparing a black dye composition. In particular, the present invention is directed to a novel process for preparing the black dye composition in a single reaction vessel. The black dye composition is prepared by reacting 1-amino-2, 4-dibromo-9,10-anthraquinone and an aromatic amine having the general formula:

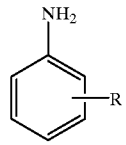

wherein R is defined above, to form 1-amino-2-bromo-4-arylamino-9,10-anthra-quinones. The 1-amino-2-bromo-4-aryl-amino-9,10-anthraquinones are then coupled in an alkyl benzoate solvent in the presence of a copper catalyst to form a black dye composition.

Still further, the present invention is directed to a novel black dye composition. It has been discovered that when R is an aryloxy functional group, the black dye composition exhibits unexpected qualities, such as solubility in the thermoplastic resin and an increased black color.

These and other advantages and features of the present invention will become more fully apparent from the following description and appended claims, or may be learned by the practice of the invention as set forth hereinafter.

DETAILED DESCRIPTION OF THE INVENTION

Because of their high color quality, high transparency and low abrasion, evenly dispersed soluble dyes are preferably used to color thermoplastic materials. While dyes provide excellent means of coloring thermoplastic materials in a wide variety of colors, there is unfortunately no "true" black organic dye which can be used with thermoplastic materials. Hence, pigments are currently the black colorant of choice for thermoplastic materials.

Carbon black pigments produce thermoplastic materials having high black color strength. However, pigments notoriously cause clogging of filter packs and erosion of spinnerets in processing steps. Also, when pigments are used to color small products, such as fine denier fibers, low quality fibers that are weak and susceptible to fragmenting are typically formed. The low quality fibers are due to the large size of the pigments which prevent adequate fiber-fiber connection to be formed within the fiber structure, resulting in weak places in the fiber which quickly break.

To overcome these problems the present invention provides a black polymeric composition that provides high color quality. In addition, the present invention provides a black polymeric composition that is capable of use with fine denier fibers without sacrificing fiber quality.

The present invention is a black polymeric composition comprising a mixture of a thermoplastic resin, preferably in an amount between about 50 weight percent and about 99.9 weight percent, and a black dye composition preferably in an amount between about 0.1 weight percent and about 50 weight percent. All weight percents are based on the total weight of the black polymeric composition.

The black polymeric composition may be converted to finished articles such as fiber, film or molded articles through existing processes well know to those skilled in the art. When the black polymeric composition is converted directly into finished articles, the black polymeric composition preferably comprises a thermoplastic resin in an amount between about 90 weight percent and about 99.9 weight percent, more preferably between about 94 weight percent and about 99 weight percent, and most preferably between about 95 weight percent and about 97 weight percents, and a black dye composition preferably in an amount between about 0.1 weight percent and about 10 weight percent, more preferably between about 1 weight percent and about 6 weight percent, and most preferably between about 3 weight percent and about 5 weight percent.

Alternatively, the black polymeric composition may be used as a color concentrate which is combined with a second thermoplastic resin to form a mixture. The second thermoplastic resin is the same as, or different from, that of the thermoplastic resin in the black polymeric composition. The mixture is then melt blended and an article is formed using conventional processes.

When the black polymeric composition is employed as a color concentrate, the black polymeric composition preferably has a high content of black dye composition. The reason for the high black dye composition content is that when the black polymeric composition is added to a second thermoplastic resin, the black polymeric composition content is in effect diluted by the additional resin. Hence, this dilution of the black polymeric composition must be taken into account when the black polymeric composition is used as a color concentrate.

The black polymeric composition used as a color concentrate preferably comprises a thermoplastic resin in an amount between about 50 weight percent and about 95 weight percent, more preferably between about 60 weight percent and about 90 weight percent, and most preferably between about 65 weight percent and about 75 weight percent, and a black dye composition preferably in an amount between about 5 weight percent and about 50 weight percent, more preferably between about 10 weight percent and about 40 weight percent, and most preferably between about 25 weight percent and about 35 weight percent.

The thermoplastic resin used to form the black polymeric composition can be any suitable thermoplastic resin, including but not restricted to polyesters, polycarbonates, polyamides, polyethylene, polypropylenes, polyurethanes and mixtures or derivatives thereof. The polyester may be polyethylene terephthalate (PET) or a copolymer of PET with any suitable glycols or diacid monomers, including, but not limited to 1,4-cyclohexanedimethanol (CHDM), diethylene glycol (DEG), isophthalic acid (IPA) or its esters, and 1,4-cyclohexanedicarboxylic acid (CHDA) or its esters. The polyamide may be any polyamide (nylon) which is useful in fiber spinning and molding applications including nylon 6,6 and nylon 6. In a preferred embodiment, the thermoplastic resin is a polyester.

The major component of the black dye composition is a black indanthrone compound, such as 8,17-bisarylaminoindanthrone (6,15-dihydro-5,9,14,18-anthrazinetetrone) represented by Formula I, wherein R is hydrogen or at least one group independently selected from: hydrogen, $C_1$–$C_8$ alkyl, $C_1$–$C_8$ alkoxy, halogen, hydroxy, trifluoromethyl, aryloxy, arylthio, arylamino, $C_1$–$C_8$ carbalkoxy, —$CO_2H$, $C_1$–$C_8$ alkanoyloxy, arylazo, —CN, —$NO_2$, —$SO_2$—$C_1$–$C_8$ alkyl, —$SO_2$—aryl, —$SO_2N(R1)$ R2, —CON(R1)R2, wherein R1 and R2 are independently selected from $C_1$–$C_8$ alkyl, $C_3$–$C_8$ cycloalkyl, aryl, or hydrogen. The alkyl groups may have substituents such as hydroxy, carboxy, halogen, $C_1$–$C_8$ alkoxy, $C_1$–$C_8$ alkanoyloxy, aryl, arylthio, or aryloxy. The aryl groups may be further substituted with groups (one or more in number) such as carboxy, $C_1$–$C_8$ carbalkoxy, $C_1$–$C_8$ alkyl, halogen, or $C_1$–$C_8$ alkoxy.

As used herein, the term "$C_1$–$C_8$ alkyl" represents a saturated hydrocarbon radical containing one to eight carbon atoms, either straight or branched chain.

The terms "$C_1$–$C_8$ carbalkoxy" and "$C_1$–$C_8$ alkanoyloxy", are used to represent groups having the formulae —$CO_2$—alkyl and alkyl—$CO_2$—, respectively, wherein the alkyl portion of the groups contain one to eight carbon atoms, being either straight or branched chain.

The term "$C_3$–$C_8$ cycloalkyl" is used to represent a saturated cyclic hydrocarbon radical containing three to eight carbon atoms.

The term "aryl" is used to represent phenyl and phenyl substituted with $C_1$–$C_6$ alkyl, $C_1$–$C_6$ alkoxy, hydroxy substituted $C_1$–$C_6$ alkyl, carboxy, $C_1$–$C_8$ carbalkoxy or halogen.

The term halogen represents fluorine, chlorine, bromine, or iodine.

The black polymeric composition is preferably prepared by a process comprising the steps of combining a suitable amount of a thermoplastic resin and a suitable amount of the black dye composition to form a mixture; and blending the mixture to form a black polymeric composition. The amounts of the thermoplastic resin and the black dye composition are mentioned above and vary depending on the use of the black polymeric composition.

Further according to the present invention, the black dye compositions may be incorporated into the thermoplastic resins using any suitable technique known in the art, including solution or melt blending. The blending is preferably melt blending performed in an extruder. Examples of solution and melt blend techniques employed to incorporate other additives in such polymers (see R. Gächter and H. Müeller, Editors: Plastics Additives Handbook, Hansu Publishers, New York, 1985, pp. 507–533; 729–741). For example, in one embodiment of the present invention, the black dye compositions is dry blended in the form of pellets or powders with or without adhesion promoters or dispersing agents. This premix can be subsequently processed on extruders or injection molding machines. Other additives such as plasticizers, nucleating agents, flame retardants, lubricants, and the like may also be present in the black polymeric composition.

As mentioned above, the black polymeric composition can be used as a color concentrate which is combined with a second thermoplastic resin to form a mixture that is formed into articles. The second resin can be the same as, or different from, the thermoplastic resin in the black polymeric composition. For example, the second thermoplastic resin can be any suitable thermoplastic resin, including, the homopolymers and copolymers of polyesters, including poly(ethylene terephthalate); polyolefins, such as polypropylene, polyethylene, linear low density polyethylene, polybutylene, and copolymers made from ethylene, propylene and/or butylene; copolymers from acrylonitrile, butadiene, and styrene; copolymers from styrene and acrylonitrile; polyamides, such as nylon 6 and nylon 6, 6; polyvinyl chloride; polyurethanes; polyvinylidene chloride; polycarbonates; cellulose esters, such as cellulose acetate, propionate, butyrate, or mixed esters; polyacrylates, such as poly(methyl methacrylate); polyamides; polyester amides; polystyrene; and mixtures or derivatives thereof.

In an alternative embodiment, the black polymeric composition comprises the reaction products of at least one diacid component or its ester forming derivative, at least one diol component, and the black dye composition represented by Formula I, wherein R is at least one groups independently selected from hydroxy, carboxy, $C_1$ to $C_8$ carbalkoxy and $C_1$ to $C_8$ alkanoyloxy.

The reaction preferably used to prepare the black polymeric composition is a copolymerization process, wherein the black dye composition is preferably present in the black polymeric composition in an amount between about 0.1 and about 30 weight percent, more preferably between about 3 and about 25 weight percent, and most preferably between about 5 and 20 weight percent.

When the black polymeric composition is prepared by a copolymerization process, the black dye composition copolymerizes into the chain of the thermoplastic resin so that the black dye composition is a monomeric unit of the black polymeric composition.

In addition, the black polymeric composition formed from the copolymerization process may be converted directly into finished articles, such as films, fibers or molded articles, or formed into a color concentrate which is combined with a second thermoplastic resin to form a mixture which is formed into an article. When the black polymeric composition formed by the copolymerization process is used as a color concentrate, the black dye composition is preferably present in the black polymeric composition in a high concentration, such as at least 20 percent and preferably between about 25 weight percent and about 30 weight percent.

The copolymerized black polymeric composition is prepared by a process comprising the steps of reacting one or more diacid components or their ester forming derivatives, one or more diol components and the black dye composition having one or more reactive R groups to form a first mixture; and forming a black polymeric composition preferably by a polymerization process.

At least one of the diacid or the diol components contains a free hydroxy, carboxy, carbalkoxy or alkanoyloxy function; and the amount of each of the components is calculated so that the total carboxy and/or carbalkoxy equivalents is balanced by an equal number of hydroxy and/or alkanoyloxy equivalents to ensure that the proper stoichiometry of the polymerization is maintained.

The diacid components are selected from the group consisting of aliphatic, alicyclic, aromatic dicarboxylic acid or ester compounds. Examples of suitable diacids include terephthalic acid, isophthalic acid, dimethyl terephthalate, dimethyl isophthalate, 1,4-cyclohexanedicarboxylic acid, 1,3-cyclohexanedicarboxylic acid, 2,6-naphthalenedicarboxylic acid, succinic acid, glutaric acid, adipic acid, sebacic acid, 1,12-dodecanedioic acid and mixtures or derivatives thereof.

The diol component is selected from the group consisting of ethylene glycol, 1,4-cyclohexanedimethanol, 1,2-propanediol, 1,3-propanediol, 1,4-butanediol, 2,2-dimethyl-1,3-propanediol, 1,6-hexanediol, 1,2-cyclohexanediol, 1,4-cyclohexanediol, 1,2-cyclohexanedimethanol, 1,3-cyclohexanedimethanol, Z,8-bis(hydroxymethyl)-tricyclo-[5.2.1.0]-decane wherein Z represents 3, 4, or 5; and diols containing one or more oxygen atoms in the chain, such as, diethylene glycol, triethylene glycol, dipropylene glycol, tripropylene glycol and mixtures or derivatives thereof.

The black polymeric composition can be used in any article formed from a thermoplastic polymer as defined above. Exemplary thermoplastic articles include moldable articles, films and fibers.

A significant advantage of the black polymeric compositions according to the present invention is their ability to be used in small articles, such as fibers of less than about 4 denier. Until the present invention, it has not been possible to form a high quality black fiber having a denier less than 4 using black pigments because of the absence of a suitable black dye and the size of the black pigments used. Black pigments are too large to be practically used in small fibers. The large area occupied by the pigments in small fibers causes weak areas in the fiber which are susceptible to breaking. Because of the polymeric nature of black polymeric compositions, in the present invention, high quality black fibers and other articles can be prepared without regard to size limitations.

Indanthrone compounds, such as those represented by Formula I, have traditionally been prepared by coupling 1-amino-2-halo-9,10-anthraquinones using naphthalene or nitrobenzene as a solvent. These solvents are, however, problematic since they are difficult to handle and hazardous to humans and the environment.

The present invention overcomes the problems associated with naphthalene and nitrobenzene solvents by employing $C_1$–$C_4$ alkyl benzoates as solvents in the formation of black dye compositions. Alkyl benzoates are high boiling aromatic esters which provide indanthrone products in good yields, substantially the same as those obtained when nitrobenzene is used as a solvent. Alkyl benzoates are easier to handle and are less hazardous than the napthalene and nitrobenzene solvents typically used.

The present invention further includes a novel one pot, two step preferred method for the preparation of the black dye compositions which involves reacting a 1-amino-2,4-dibromo-9,10-anthraquinone with a suitable aromatic amine species to prepare the 1-amino-2-bromo-4-arylamino-9,10-anthraquinone in situ followed by coupling in the presence of a copper catalyst to give a desired black dye composition.

The preferred aromatic amine has the general formula:

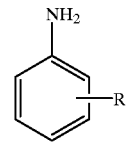

Formula III wherein R is defined above in reference to the black polymeric composition (Formula I).

A novel one pot, two step process is defined for purposes of this invention as forming the black dye composition without isolating the 1-amino-2-halo-4arylamino-9,10 anthraquinone intermediate which until the present invention has not been possible.

The black dye compositions are preferably prepared by condensing 1-amino-2-bromo-4-arylaminoanthraquinones of Formula II, wherein R is as defined above in reference to the black polymeric composition (Formula I). The condensation step is carried out in the presence of a copper catalyst and a base in a high boiling solvent to form a reaction mixture as illustrated in (Scheme I).

Scheme I

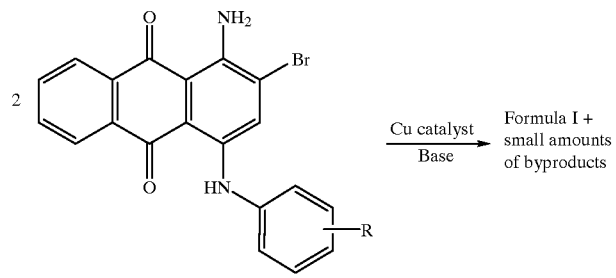

Formula II 1-amino-2-halo-9,10-anthraquinones using naphthalene or nitrobenzene as a solvent. These solvents are, however, problematic since they are difficult to handle and hazardous to humans and the environment.

The black dye compositions can be isolated by any suitable isolation means and are preferably isolated by drowning the reaction mixture into an alcohol such as methanol, ethanol or 2-propanol, filtering and washing well with an alcohol, such as methanol, or a ketone such as acetone to remove by-products present. One undesirable by-product is thought to be a 1-amino-4-arylaminoanthraquinone compound produced by debromination of the composition represented by Formula II. Small amounts of by-products are tolerable in black dye composition. Mass spectral analyses indicate compounds of Formula I to be the major components of the black dye compositions.

The high boiling point solvent used to form the black dye composition include nitrobenzene, nitrotoluene, nitroxylenes, naphthalene, $C_1$–$C_4$ alkylnaphthalenes, 1-halonaphthalenes, $C_1$–$C_4$ alkyl benzoates, diaryl ethers (e.g. diphenyl ether) trichlorobenzenes, and mixtures or derivatives thereof. Typical bases which may be used include sodium carbonate, potassium carbonate, sodium acetate, potassium acetate, 1,8-diazabicyclo[5.4.0]undec-7-ene (DBU), 1,5-diazabicyclo[5.4.0]non-5-ene (DBN) and mixtures or derivatives thereof. Copper catalysts which may be used to form the black dye composition include copper metal, cupric acetate, cupric bromide, cuprous chloride, and mixtures thereof. A discussion of known indanthrone chemistry can be found in "The Chemistry of Synthetic Dyes and Pigments", Lubs, Reinhold Publishing Corp., 1955, pgs 513–514, which is hereby incorporated by reference.

The present invention is further directed to a novel black dye composition. It has been discovered that when the black dye composition having the generic structure represented by Formula I, wherein R is an aryloxy, the black dye composition exhibits unexpected qualities, such as increased solubility in the thermoplastic resin and an increased black color.

The black dye compositions may be useful in many applications other than use in polymeric compositions, such as in inks, printing solutions, paints, color concentrates, toners, coatings, films and any other application wherein a black colorant is used.

The black polymeric composition in the present invention provides and maintains high black color quality in thermoplastic materials, such as molded articles, films and fibers. Furthermore, the black polymeric composition is small enough to function as a black colorant for fine denier fibers, such as fibers of less that 4 denier/filament.

The following examples further illustrate the present invention but are not intended to limit the reasonable scope thereof.

EXAMPLE 1

A black indanthrone compound was prepared by heating 22 parts 1-amino-2-bromo-4-[4-(4'-carbomethoxyphenoxy) phenylamino]-9,10-anthraquinone in 240 parts nitrobenzene containing 8 parts potassium acetate and 2 parts cupric acetate to reflux for a period of 45 minutes. The mixture was allowed to cool and drowned into 950 parts methanol. The mixture was then filtered and washed with 400 parts methanol, followed by 400 parts acetone. The solids were slurried in boiling water and collected by filtration. The solids were again washed with 400 parts methanol to give 16.6 parts of a black dye composition consisting mainly of 8,17-bis(4-(4'-carbomethoxy-phenoxy)phenylamino) indanthrone.

EXAMPLE 2

A black indanthrone compound was prepared by combining 9.71 parts 1-amino-2-bromo-4-(4-phenoxyphenylamino)anthraquinone, 3.98 parts potassium acetate and 0.80 parts cupric acetate in 109.4 parts methyl benzoate to form a mixture. The mixture was heated to reflux (198° C.). After about 1 hour and 30 minutes at reflux, the mixture was allowed to cool and stand overnight. The mixture was a heavy slurry upon cooling. The heavy slurry mixture was stirred as 158 parts methanol was added dropwise in a rapid fashion. This mixture was filtered and washed with 80 parts methanol, hot water and finally with 160 parts acetone. The solids were air dried to give 6.34 parts of a black dye composition consisting mainly of 8,17-bis(4-phenoxyphenylamino)indanthrone (78%).

EXAMPLE 3

A black indanthrone compound was prepared by adding 114.4 parts 2-amino-2,4-dibromoanthraquinone and 57.4 parts 4-phenoxyaniline in 875 parts methyl benzoate to 58.8 parts potassium acetate and 3 parts cupric acetate. This mixture was then heated with stirring to 135–140 degrees C. for 7 hours at which time another 220 parts methyl benzoate was added. Stirring at 135–140 degrees C. continued for an additional 6 hours. The mixture was cooled to room temperature and 58.8 parts potassium acetate was added. The mixture was then heated to reflux using a Dean-Stark trap to remove low boiling by products which permitted the temperature in the flask to remain at 196–198 degrees C. The mixture was stirred at reflux for 1.5 hours and cooled with stirring. The product was isolated as in Example 2 and gave a similar yield of a black dye composition consisting mainly of 8,17-bis(4-phenoxyphenylamino)indanthrone.

EXAMPLE 4

A black polymeric composition was prepared by first combining 400 parts ground PETG 6763 (Eastman Amorphous Copolyester) with 0.40 parts of the black dye composition of Example 1. The combination was mixed by tumbling the materials in a jar to form a blend. The blend was then dried at 70° C. for 17 hours under vacuum and extruded on a Brabender 1" single screw extruder fitted with an Egan Mixing screw. The resulting compounded material was again dried at 70° C. for 17 hours under vacuum. Some of this dry compounded material was used to press amorphous 0.020 inch films for UV/V is spectra and lightfastness testing.

Compression molded films were then prepared by placing a small amount of the compounded material on a metal plate which had a 1.5 inch round 0.020 inch deep depression machined into its surface. This metal plate was placed on a heated hydraulic press at a temperature of 265 degrees C. for 2 minutes to soften the compounded pellets. A thin metal plate was placed over the heated metal plate holding the pellets and the hydraulic press was closed with a force of greater than 1000 psi and held closed for 1 minute. The press was then opened and the two metal plates with the polymer between was removed from the press and quenched in a cold water bath. The plates were separated and an amorphous 0.020 inch thick film was removed from the plates. The sample was observed to fade slightly after 226 kJ exposure in an Atlas CI65 Xenon Arc Fadeometer (SAE Procedure J1885—Rev. March 1992). No further fading was observed until exposure at more than 900 kJ exposure, at which the sample exhibited moderate fading.

EXAMPLE 5

Compression molded films were formed by dry blending 291.9 parts of Eastman PET 9921 Copolyester with 8.1 parts (2.9 wt %) of the black dye composition of Example 1 as described above. The resultant compounded material was compression molded as described above to give a 0.020 inch film. Lightfastness testing of the film revealed no observable fading after 1128 kJ exposure when tested as described in Example 4 except the compression molding step was carried out at 285 degrees C.

EXAMPLE 6

A black polymeric composition according to the present invention was prepared by dry blending 295.95 parts of Eastman PET 9921 Copolyester with 4.05 parts (1.35 wt %) of the black dye composition of Example 1 above and compression molded to give a 0.020 inch film. Lightfastness testing revealed no observable fading after 1128 kJ exposure when tested as described in Example 4.

EXAMPLE 7

A black polymeric composition was prepared by dry blending 298.65 parts of Eastman PET 9921 Copolyester with 1.35 parts (0.45 wt %) of the black dye composition of Example 1 and compression molded to give a 0.020 inch film. Lightfastness testing revealed no observable fading after 1128 kJ exposure when tested as described in Example 4.

EXAMPLE 8

A black polymeric composition suitable for use as a color concentrate is formed by dry blending 900 parts of Eastman PET 7352 polyester resin with 100 parts (10 weight percent) of the black dye composition of Example 3. The dry blend is then extruded using a compounding extruder to produce a black polymeric composition consisting of 10 weight percent of the black dye composition in PETG 6763 in pellet form.

EXAMPLE 9

A black polymeric composition suitable for use as a color concentrate is formed by dry blending 750 parts of Eastman PETG 6763 copolyester resin with 250 parts (25 weight percent) of the black dye composition of Example 3. The dry blend is then extruded using a compounding extruder to produce a black polymeric composition consisting of 25 weight percent of the black dye composition in PET 7352 in pellet form.

EXAMPLE 10

The black concentrate of Example 8 is combined with Eastman PET 7352 resin in a 1:4 weight ratio and fed to an fiber spinning line producing 1 denier per filament (dpf) polyester fiber containing 2 weight percent of the black dye composition described in Example 3.

EXAMPLE 11

The black concentrate of Example 9 is combined with Eastman PET 7352 resin in a 1:9 weight ratio and fed to a fiber spinning machine producing 0.2 dpf polyester fiber using the islands in the sea technique containing 2.5 weight percent of the black dye composition described in Example 3.

We claim:
1. A polymeric composition comprising a mixture of:
   a thermoplastic resin; and
   a black dye composition;
   wherein the black dye composition comprises a compound having the general formula:

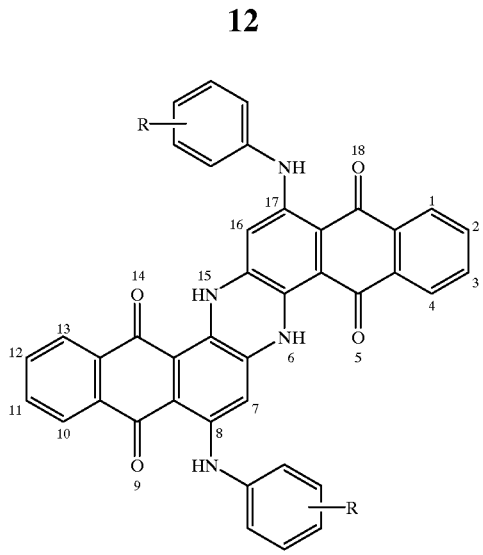

wherein R represents hydrogen or at least one group independently selected from $C_1-C_8$ alkyl, $C_1-C_8$ alkoxy, halogen, hydroxy, trifluoromethyl, aryloxy, arylthio, arylamino, $C_1-C_8$ carbalkoxy, $-CO_2H$, $C_1-C_8$ alkanoyloxy, arylazo, $-CN$, $-NO_2$, $-SO_2-C_1-C_8$ alkyl, $-SO_2N(R1)R2$, and $-CON(R1)R2$, wherein R1 and R2 are independently selected from $C_1-C_8$ alkyl, $C_3-C_8$ cycloalkyl, aryl and hydrogen.

2. A polymeric composition as recited in claim 1, wherein the thermoplastic resin is present in an amount between about 50 weight percent and about 99.9 weight percent, and the black dye composition is present in an amount between about 0.1 weight percent and about 50 weight percent.

3. A polymeric composition as recited in claim 1, wherein the thermoplastic resin is present in an amount between about 90 weight percent and about 99.9 weight percent, and the dye composition is present in an amount between about 0.1 weight percent and about 10 weight.

4. A polymeric composition as recited in claim 1, wherein the thermoplastic resin is present in an amount between about 94 weight percent and about 99 weight percent, and the dye composition is present in an amount between about 1 weight percent and 6 weight percent.

5. A polymeric composition as recited in claim 1, wherein the thermoplastic resin is present in an amount between about 95 weight percent and about 97 weight percent, and the dye composition is present in an amount between about 3 weight percent and 5 weight percent.

6. A polymeric composition as recited in claim 1, wherein the thermoplastic resin is present in an amount between about 50 weight percent and about 95 weight percent, and the dye composition is present in an amount between about 5 weight percent and 50 weight percent.

7. A polymeric composition as recited in claim 1, wherein the thermoplastic resin is present in an amount between about 60 weight percent and about 90 weight percent, and the dye composition is present in an amount between about 10 weight percent and 40 weight percent.

8. A polymeric composition as recited in claim 1, wherein the thermoplastic resin is present in an amount between about 65 weight percent and about 75 weight percent, and the dye composition is present in an amount between about 25 weight percent and 35 weight percent.

9. A polymeric composition as recited in claim 1, wherein R represents hydrogen or 1 to 3 groups independently selected from $C_1-C_8$ alkyl, $C_1-C_8$ alkoxy, halogen, hydroxy, trifluoromethyl, aryloxy, arylthio, arylamino, $C_1-C_8$ carbalkoxy, —CO₂H, C₁–C₈ alkanoyloxy, arylazo, —CN, —NO₂, —SO₂—C₁–C₈ alkyl, —SO₂N(R1)R2, and —CON(R1)R2, wherein R1 and R2 are independently selected from C₁–C₈ alkyl, C₃–C₈ cycloalkyl, aryl and hydrogen.

10. A polymeric composition as recited in claim 1, wherein the thermoplastic resin is selected from the group consisting of a polyester, polycarbonate polyamide, polyethylene, polypropylene, polyurethane, and mixtures or derivatives thereof.

11. A polymeric composition as recited in claim 10, wherein the polyester is selected from a polyethylene terephthalate, a copolymer of polyethylene terephthalate and a glycol monomer, a copolymer of polyethylene terephthalate and a diacid monomer, and mixtures or derivatives thereof.

12. A polymeric composition as recited in claim 11, wherein the copolymer of polyethylene terephthalate is selected from 1,4-cyclohexane dimethanol, diethylene glycol, isophthalic acid, isophthalic acid esters, 1,4-cyclohexane dicarboxylic acid, and 1,4-cyclohexane dicarboxylic acid esters.

13. A polymeric composition as recited in claim 10, wherein the polyamide is selected from nylon 6,6 and nylon 6.

14. A polymeric composition as recited in claim 1, wherein the C₁ to C₈ alkyl and the C₁–C₈ alkoxy groups have substituents selected from the group consisting of hydroxy, carboxy, halogen, C₁–C₈ alkoxy, C₁–C₈ alkanoyloxy, aryl, arylthio, and aryloxy.

15. A polymeric composition as recited in claim 1, wherein the aryloxy, arylthio, arylamino, arylazo, and —SO₂—aryl have substituents selected from carboxy, C₁–C₈ carbalkoxy, C₁–C₈ alkyl, halogen, and C₁–C₈ alkoxy.

16. An article comprising a polymeric composition as recited in claim 1.

17. An article as recited in claim 16, wherein the article is a fiber.

18. An article as recited in claim 17, wherein the fiber has a denier no greater than about 4.

19. An article as recited in claim 16, wherein the article is a film.

20. An article as recited in claim 16, wherein the article is molded article.

21. A process for preparing a polymeric composition, the process comprising the steps of:

combining a thermoplastic resin in an amount between about 50 weight percent and about 99.9 weight percent and a black dye composition in an amount between about 0.1 weight percent and about 50 weight percent to form a mixture;
   wherein the black dye composition comprises a compound having the general formula:

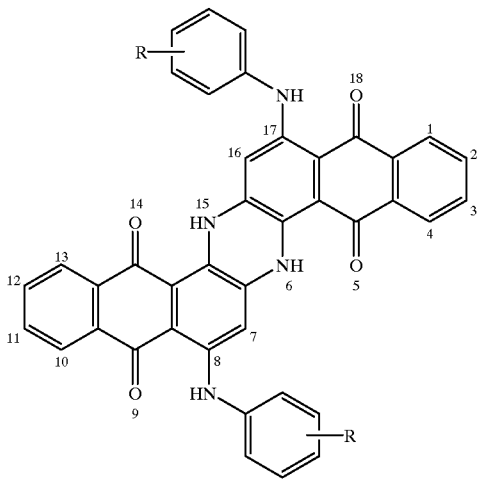

wherein R represents hydrogen or at least one group independently selected from C₁–C₈ alkyl, C₁–C₈ alkoxy, halogen, hydroxy, trifluoromethyl, aryloxy, arylthio, arylamino, C₁–C₈ carbalkoxy, —CO₂H, C₁–C₈ alkanoyloxy, arylazo, —CN, —NO₂, —SO₂—C₁–C₈ alkyl, —SO₂N(R1)R2, and —CON(R1)R2, wherein R1 and R2 are independently selected from C₁–C₈ alkyl, C₃–C₈ cycloalkyl, aryl and hydrogen; and
   melt blending the mixture to form a polymeric composition.

22. A process for preparing a polymeric composition as recited in claim 21, wherein the melt blending is performed in an extruder.

23. An article prepared from a process comprising the steps of:
   providing a polymeric composition comprising a first thermoplastic resin in an amount between about 50 weight percent and about 95 weight percent, and a black dye composition in an amount between about 5 weight percent and about 50 weight percent;
   wherein the black dye composition comprises a compound having the general formula:

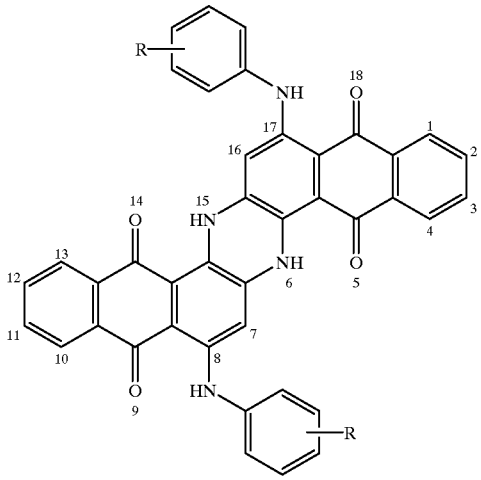

wherein R represents hydrogen or at least one group independently selected from C₁–C₈ alkyl, C₁–C₈ alkoxy, halogen, hydroxy, trifluoromethyl, aryloxy, arylthio, arylamino, $C_1$–$C_8$ carbalkoxy, —$CO_2H$, $C_1$–$C_8$ alkanoyloxy, arylazo, —CN, —$NO_2$, —$SO_2$—$C_1$–$C_8$ alkyl, —$SO_2N(R1)R2$, and —$CON(R1)R2$, wherein R1 and R2 are independently selected from $C_1$–$C_8$ alkyl, $C_3$–$C_8$ cycloalkyl, aryl and hydrogen;

melt blending the polymeric composition and a second thermoplastic resin to form a mixture, wherein the first and the second thermoplastic resin are the same or different; and forming the mixture into an article.

24. An article as recited in claim 23, wherein the article comprises between about 0.1 weight percent and about 10 weight percent of the black dye composition.

25. An article prepared from a process as recited in claim 23, wherein the article comprises between about 1 weight percent and about 6 weight percent of the black dye composition.

26. An article prepared from a process as recited in claim 23, wherein the article comprises between about 3 weight percent and about 5 weight percent of the black dye composition.

27. An article prepared from a process as recited in claim 23, where in the first thermoplastic resin and the second thermoplastic resin are independently selected from homopolymers and copolymers of polyesters, polypropylene, polyethylene, linear low density polyethylene, polybutylene, and ethylene propylene copolymers, ethylene butylene copolymers, propylene butylene copolymers, ethylene propylene butylene copolymers, acrylonitrile butadiene styrene copolymers, styrene acrylonitrile copolymers, polyamides, polyvinyl chloride, polyurethanes, polyvinylidene chloride, polycarbonates, cellulose esters, polyacrylates, polyamides, polyester amides, polystyrene, and mixtures or derivatives thereof.

28. An article prepared from a process as recited in claim 23, wherein the article is a fiber.

29. An article prepared from a process as recited in claim 23, wherein the article is a film.

30. An article prepared from a process as recited in claim 23, wherein the article is a molded article.

* * * * *

UNITED STATES PATENT AND TRADEMARK OFFICE
CERTIFICATE OF CORRECTION

PATENT NO. : 5,973,038
DATED : October 26, 1999
INVENTOR(S) : Max Allen Weaver, Clarence Alvin Coates, Jr., Jean Carroll Fleischer, and Brian Edison Maxwell It is certified that error appears in the above-identified patent and that said Letters Patent is hereby corrected as shown below:

Column 12, line 38 (Claim 3, line 5), between "10 weight" and the period (.), -- percent -- should be inserted.

Signed and Sealed this

Twentieth Day of June, 2000

Attest:

Q. TODD DICKINSON

*Attesting Officer*  *Director of Patents and Trademarks*